R. P. Adams,
Boring Posts.
N° 10,952. Patented May 23, 1854.
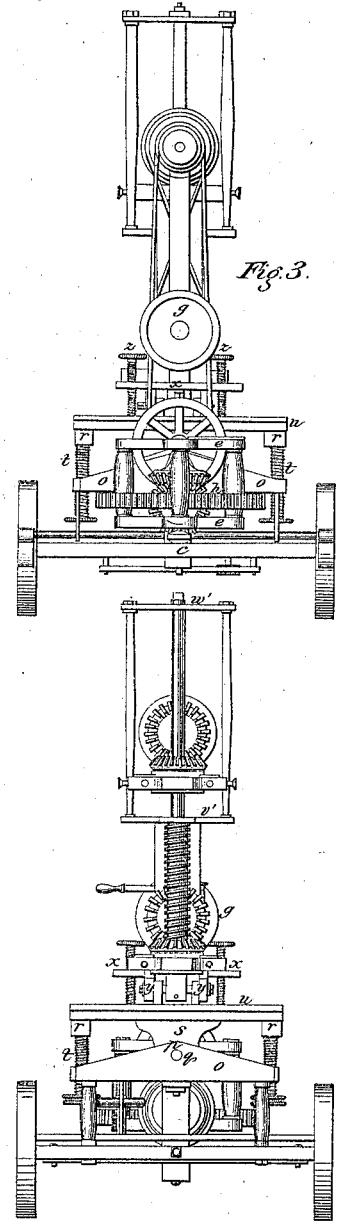
Fig. 3.
Fig. 4.
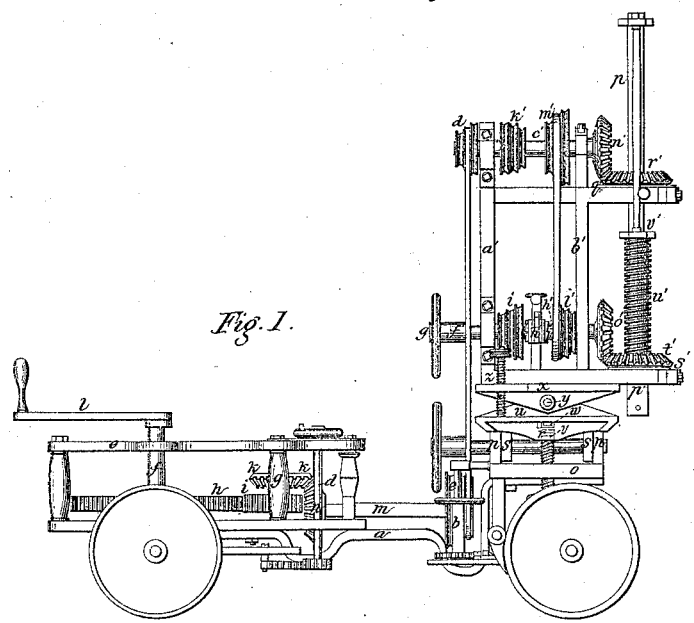
Fig. 1.
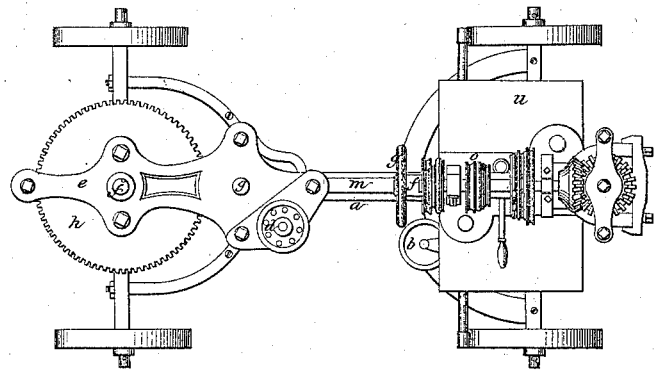
Fig. 2.

UNITED STATES PATENT OFFICE.

RANSOM P. ADAMS, OF CLINTON, ILLINOIS.

EXCAVATOR FOR FENCE-POSTS.

Specification of Letters Patent No. 10,952, dated May 23, 1854.

*To all whom it may concern:*

Be it known that I, RANSOM P. ADAMS, of Clinton, Dewitt county, Illinois, have invented a new and useful Improvement in Machines for Boring Holes for Fence-Posts; and I do hereby declare that the following is a full, clear, and exact description of the construction and operation of the same, reference being had to the accompanying drawings, making part of this specification, in which—

Figure 1 is a side view, Fig. 2 is a top view, Fig. 3 is a front view, and Fig. 4 is a back view.

The letters of reference refer to the same parts in the different figures wherever they occur.

The construction of the machine is as follows:

I make a four wheeled carriage, the fore and hind axles of which are connected by a perch ($a$) and coupled in the usual manner by a bolt ($c$) to enable the carriage to turn with facility. The hind wheels are furnished with a brake ($b$), and the fore axle with a steering apparatus ($d$) consisting of a vertical shaft, with hand wheel keyed to the top, and pinion leaves on the lower end which work in a toothed arc of a circle (of which ($c$) is the center) attached to the fore axle. Resting upon the fore axle and perch is a frame ($e$) which affords journals to the vertical shafts $f$ and $g$ and the vertical shaft of the steering apparatus $d$. The spur wheel $h$ is keyed to the shaft $f$ and is nearly concentric with the bolt $c$; it works in the spur wheel $i$, keyed upon the shaft $g$, which shaft has also keyed to it a bevel wheel ($k$). The shaft $f$ is prolonged above the frame $e$, and carries a crank handle ($l$) for which a lever beam may be substituted with the usual contrivances for attaching one or more horses, thus constituting a portable horsepower, which by means of a shaft ($m$) and its bevel wheel ($n$) working in the bevel wheel $k$ serves to communicate motion to the machinery on the hind axle hereafter described.

Supported by uprights on the hind axle and perch is a frame ($o$) which affords journals at $p$, $p$ for the horizontal shaft $q$. Above the frame $o$ is placed a slotted piece ($r$) which has projections ($s$, $s$) on its under side, through which the shaft $q$ passes and forms a pivot which allows the piece $r$ to assume a laterally inclined position with reference to the frame $o$, when acted upon by the set screws $t$, $t$, working in the side pieces of the frame $o$. Upon the slotted piece $r$, is placed a slide or platform ($u$) furnished with flanges or guides which hold it down to the piece $r$, and admit only of lateral motion which is communicated to it by the spur wheel $v$, upon the shaft $q$, operated by the hand wheel thereon and working (through the slot in the piece $r$) in the rack $w$, attached to the under side of the platform $u$.

Above the platform $u$, is placed a bed piece ($x$) which by means of projections on its under side, and corresponding projections on the upper side of $u$, united by the pivot $y$, can be inclined with reference to the plane of the platform $u$, in the direction of the length of the carriage when acted upon by the set screws $z$, $z$.

Upon the bed piece $x$ is bolted a superstructure which sustains the boring apparatus. It consists of two uprights $a'$ and $b'$ with two crosspieces. A shaft ($c'$) is journaled in the uprights, and carries keyed on its forward end a pulley ($d'$). It receives its motion from the shaft $m$ by means of a band from the pulley $e'$ fixed on the shaft. Another shaft ($f'$) is journaled in the uprights carrying on its forward end a hand wheel ($g$), a clutch ($h$) with projections on each side taking into corresponding projections on the inside surfaces of two loose pulleys on the same shaft when desired. One of the pulleys ($i$) is worked by a straight band from a fixed pulley ($k'$) on the shaft $c'$, and the other by a crossed band from another fixed pulley ($m'$) also on the shaft $c'$.

The shafts $c'$ and $f'$ have each of them a bevel wheel ($n'$ and $o'$) fixed on their extremities outside of the upright $b'$ and in rear thereof.

A continuation of the upper cross piece affords a journal to a flanged collar ($q'$) having, attached to it, a bevel wheel ($r'$) with a feather inside which takes into a groove in the upper or guide portion of the auger shaft $p'$ which passes through the collar $q'$ and wheel $r'$, the latter working in the bevel wheel $n'$. The lower cross piece is also continued to the rear affording a journal to a flanged nut ($s'$), to which is attached a bevel wheel ($t'$) working in the bevel wheel $o'$.

A hollow cylinder ($u'$) (through which passes the lower portion of the shaft $p'$) has a screw cut on the outside thereof, and works in the nut $s'$, it has a cross piece $v'$ on its upper extremity which is connected by rods (guided by the pins $x'$) with a cross piece ($w'$) fixed on the top of the auger shaft $p'$ in such a manner as to admit of the rotary motion of the shaft.

The operation of the machine is as follows: A horse being attached to a lever beam in place of the crank handle $l$ draws the carriage, the driver (whom I designate as No. 1,) steering by the apparatus $d$. When it has proceeded the desired distance it is stopped by the brake $b$, applied by No. 1, he then, if the ground inclines in the direction of the axle elevates the platform $u$, at one end until the auger shaft is brought perpendicular to the horizon in the direction of the axle, by means of the set-screws $t, t$, which may be connected with one another by bands upon pulleys upon their ends, or by equivalent means, so that they may both be operated from one side of the machine. Then No. 1 if the auger is not directly in the required line of the fence, moves the superstructure laterally, by means of the shaft $q$, and its spur wheel $v$, operating upon the rack $w$, until it is in the proper position. In the mean time a man (whom I designate as No. 2) standing upon the platform $u$ (if the ground should incline in the direction of the length of the machine) elevates one end of the bed piece until the auger shaft is perpendicular to the horizon in that direction, by means of the set-screws $z, z$. The auger shaft being thus adjusted in a perpendicular position, with the auger directly over the spot where the hole is to be bored, the horse still attached to the lever $l$ is driven round "in the direction of the sun" communicating a rotary motion to the auger by the machinery before described. No. 2 then throws the pulley $i'$ into gear by means of the clutch $n'$, (operated by a lever) which gives such a direction to the revolving nut $s'$ (geared to the shaft $f'$) as to cause the screw cylinder $u'$ to descend, bringing with it the revolving auger shaft by its connection therewith, thus boring a hole in the ground. When the proper depth is attained No. 2 reverses the motion of the shaft $f'$ by releasing the pulley $i'$ and throwing the pulley $l'$ into gear, withdraws the auger from the hole, while it still revolves in the same direction. The machine is then moved to the place where the next hole is to be bored and the above operations are repeated.

If it is desired to elevate or depress the auger when the machinery is not in motion (the pulleys $i'$ and $l'$ being out of gear) recourse is had to the hand wheel on the shaft $f'$.

By substituting a suitable auger and adding a movable bench to the machine, the apparatus may be advantageously used to bore holes in the posts themselves, in which to insert the ends of the rails.

What I claim as my invention and desire to secure by Letters Patent is—

1. The arrangement of the drill gearing and clutch upon and within a frame pivoted to, and adjustable upon the sliding and adjustable platform $u$ in the manner and for the purposes herein set forth.

2. I also claim making said sliding platform adjustable upon, and pivoted to a fixed frame upon a traveling carriage in the manner and for the purposes herein described and set forth.

RANSOM P. ADAMS.

Witnesses:
DANIEL ROBBINS,
AARON NAGLEY.